United States Patent [19]

D'Souza

[11] 4,031,354
[45] June 21, 1977

[54] ROTARY HEATING APPARATUS FOR PUFFING BORAX

[75] Inventor: Godfrey B. D'Souza, Etobicoke, Canada

[73] Assignee: Canada Packers Limited, Toronto, Canada

[22] Filed: Oct. 9, 1975

[21] Appl. No.: 621,114

Related U.S. Application Data

[62] Division of Ser. No. 470,295, May 15, 1974, Pat. No. 3,944,651.

[52] U.S. Cl. .............................. 219/389; 34/57 R; 34/142; 219/388; 252/378 R; 423/279
[51] Int. Cl.² ............................................ F27B 7/00
[58] Field of Search .......... 219/388, 389, 400, 471; 13/21; 34/108, 109, 112, 115, 142, 13, 57 B, 57 R, 57 C, 57 E, 21; 423/279, 276; 252/135, 378 R; 106/40; 259/155; 99/443 R, 443 C, 450

[56] References Cited

UNITED STATES PATENTS

| | | | |
|---|---|---|---|
| 1,433,735 | 10/1922 | MacFarland | 219/389 |
| 2,029,524 | 2/1936 | Denning | 252/378 R |
| 2,097,411 | 10/1937 | Corkill | 423/279 |
| 2,168,797 | 8/1939 | Havis | 219/389 X |
| 2,354,100 | 7/1944 | Bowen | 219/389 |
| 2,721,069 | 10/1955 | Old et al. | 252/378 R |
| 3,037,940 | 6/1962 | Pixley et al. | 252/378 R |
| 3,319,351 | 5/1967 | Sprissler et al. | 219/389 X |
| 3,368,475 | 2/1968 | Truax | 219/388 X |
| 3,415,940 | 12/1968 | McMullen | 13/21 |

*Primary Examiner*—Volodymyr Y. Mayewsky
*Attorney, Agent, or Firm*—Bacon & Thomas

[57] ABSTRACT

A rotary inclined tubular drier for puffing or expanding borax and a process for the production of puffed or expanded borax beads of desired physical characteristics. A rotatable tube is mounted on bearing wheels and surrounded by a fixed, close-fitting, insulated tube having electrical heating elements running lengthwise attached to its inside wall. The rotatable tube is fed continuously with granular borax feedstock by a vibratory feeder from its higher end and the puffed borax is discharged into a discharge chute from the lower end of the tube. A counter current of dry air is maintained by a suction hood at the high end of the tube, and borax is prevented from adhering to the interior of the tube by an adjustable, spring-loaded, internal scraper. The temperature of the drier is controlled by means of a pyrometer incorporated into a scraper support rod on the interior of the tube. Puffed borax beads of particularly desirable characteristics for detergent use are produced from sodium tetraborate pentahydrate by heating the drier to 220°–450° F and adjusting the angle of incline and rate of rotation so as to provide a 45–90 second residence time in the drier for the borax.

8 Claims, 6 Drawing Figures

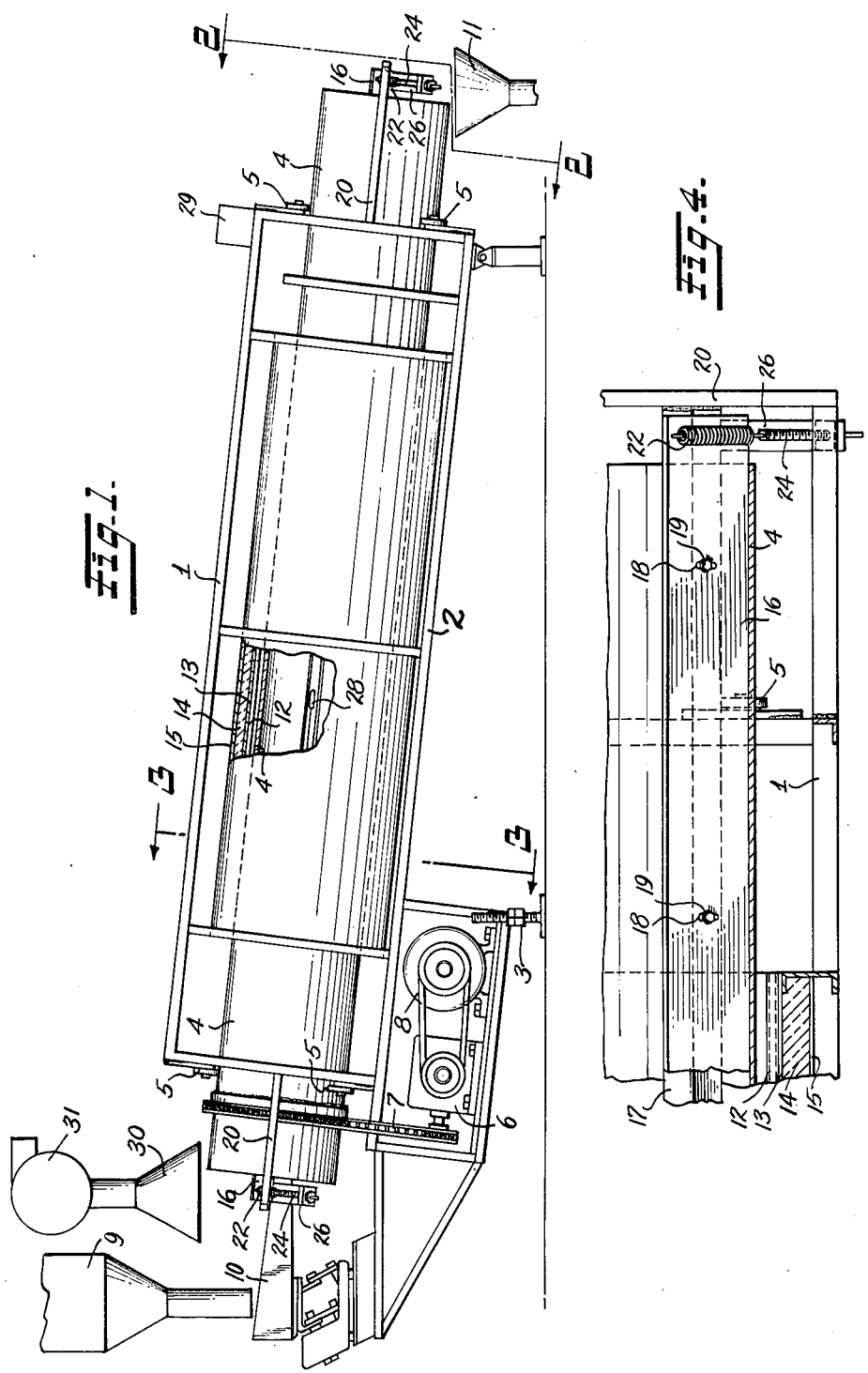

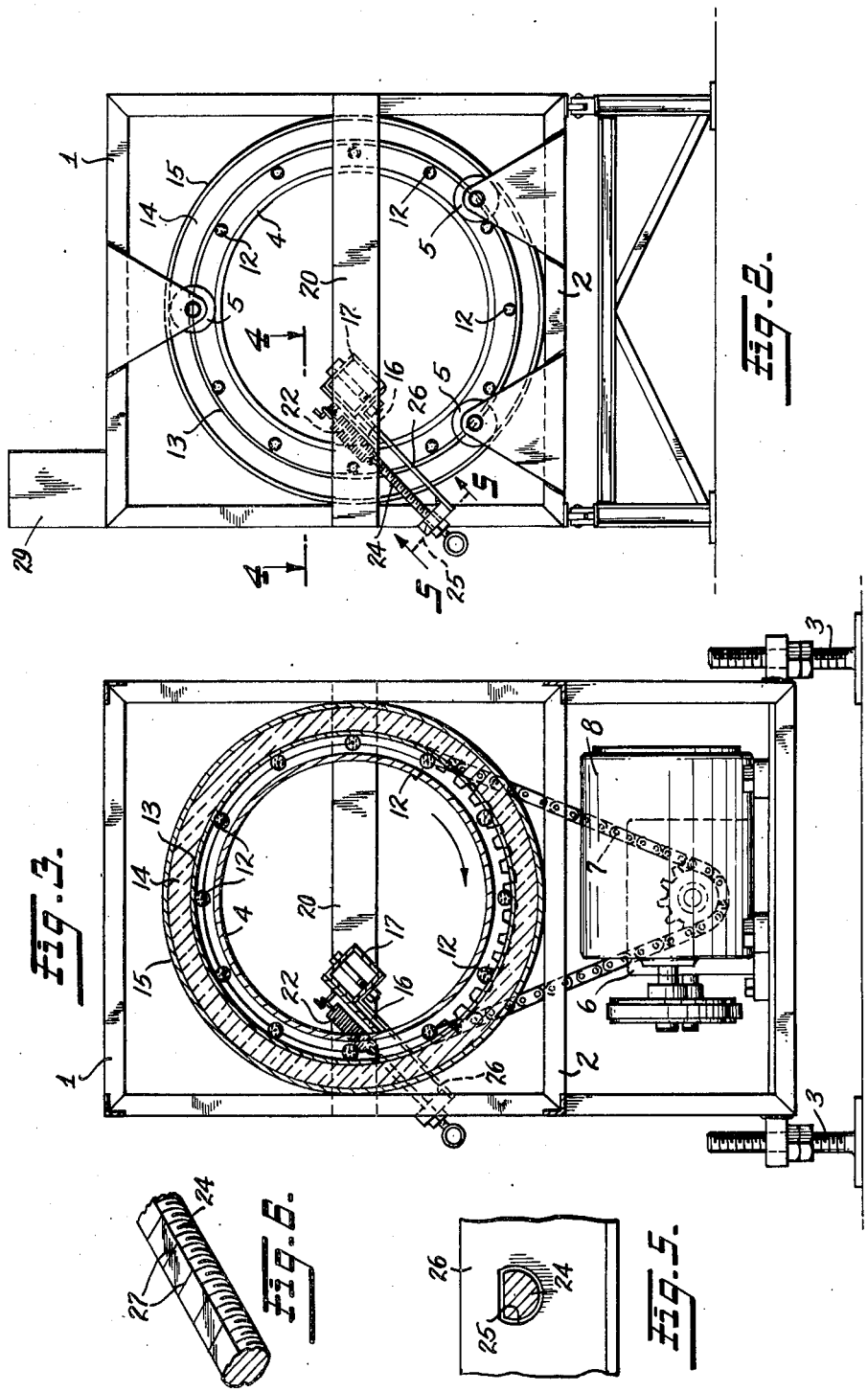

ROTARY HEATING APPARATUS FOR PUFFING BORAX

This application is a division of copending application Ser, No. 470,295, filed May 15, 1974, and issued on Mar. 16, 1976, as U.S. Pat. No. 3,944,651.

This invention relates to the provision of an apparatus and process for the production of puffed or expanded borax beads of desired physical characteristics. The product of the invention is useful as a carrier for liquid components of laundry and industrial powder detergents produced by a dry, cold, spray mix operation as distinct from the conventional, wet-slurry, hot, spray-tower process.

The apparatus consists of a specially-designed, inclined, rotating-tube, drier. The process consists of continuously feeding a specified grade of granular borax feed stock into the drier, and operating it at a controlled temperature, feed rate and particle residence time.

The preparation, properties and uses of expanded or puffed borax have been described in the January, 1965 technical bulletin of the American Potash and Chemical Corporation. Further information on the suggested use of puffed borax in several products such as household and industrial powder detergents, bulking agents, fire retardants and in insulation is provided in an article by R. C. Rhees in Soap and Chemical Specialties, Volume XL11, January 1966, pages 58–61 and 118–120. The technical bulletin describes a borax puffer and associated equipment which consists mainly of a puffing gun constructed out of black iron pipe and operated by flue gas from a direct fired gas burner, the borax feedstock being drawn into the puffing gun by a venturi effect at the burner sleeve. The product is discharged through cyclones into a receiver. Among the problems associated with this process is the direct contact of the flue gas with the product, which could result in product contamination in cases of imcomplete combustion making the product unfit for detergent use. Another disadvantage is the relatively high capital cost, and large sales volume requirement to justify the installation of this equipment, thus precluding its use by smaller scale producers.

It has been suggested in U.S. Pat. No. 2,673,841 that borax might be dried in an externally heated, rotary drum provided with rotating paddles for moving through the mass of crystals and agitating same. However, problems with fusion and control of crystal size are believed to be inherent in this type of apparatus.

An object of this invention therefore is to provide an apparatus and process which minimizes the aforementioned problems.

Another object of the invention is to provide apparatus for the continuous drying of borax which can be obtained at low cost and which is adaptable to production rates as low as 100 to 200 pounds/hour. Another object is to provide borax drying apparatus in which the product does not come into direct contact with flue gases and is therefore uncontaminated by extraneous impurities from the gas.

A still further object is to provide a process for producing borax beads of particularly desirable characteristics for use in detergent compositions.

The foregoing objects of the invention are attained in the embodiment described in the following description and illustrated in the accompanying figures in which:

FIG. 1 is a fragmentary side elevational view, partly in section, of the apparatus of the present invention;

FIG. 2 is an enlarged end view of the apparatus of FIG. 1, taken on the line 2—2 thereof;

FIG. 3 is a transverse sectional view, taken on the line 3—3 of FIG. 1;

FIG. 4 is a fragmentary horizontal sectional view, taken on the line 4—4 of FIG. 2;

FIG. 5 is an enlarged fragmentary vertical sectional view, taken on the line 5—5 of FIG. 2;

FIG. 6 is a fragmentary perspective view of a portion of the adjustment rod for the scraper blade, or strip brush showing the markings thereon.

Referring now to FIGS. 1–4 of the drawings, the apparatus comprises a frame 1 of mild steel, having a base 2, which base is subject to manual angular adjustment by mechanical or hydraulic means 3, so that its slope can be varied as required. A horizontal stainless steel tube 4, is mounted on bearing wheels 5 (FIG. 2), supported from the frame 1, and is driven by a variable speed reducer 6 and chain drive 7, from motor 8 so that the tube 4 rotates in a clock-wise manner when viewed from the discharge end.

The cylindrical stainless steel tube 4 is fed with feedstock from hopper 9 by a vibratory feeder 10 at the higher, driven end. The product is discharged through a chute 11 at the lower end into bags or silos for further processing.

The tube 4 is heated externally by a number of lengthwise electrical tubular elements 12, mounted on the inner wall of a stationary, outer concentric stainless steel tube 13 which is supported within its frame 1. This outer tube 13 is insulated with insulating material 14 having a metal cover 15. The clearance between the fixed heating elements 12 and rotating tube 4 along its entire length should be such as to maintain adequate clearance with maximum heat transfer, after thermal expansion of the inner tube 4 has occurred during operation.

The puffed borax adhering to the inner wall of the rotating tube 4 is continuously scraped to a falling curtain within the tube 4, by means of a spring-loaded stainless steel scraper blade 16 which is adjustably mounted on a scraper support 17 by cooperating slots 18 and bolts 19 (FIG. 4). Scraper support 17 is in turn secured to end brackets 20 supported by frame 1. The scraper blade 16, which preferably has a 45° knife edge, should bear true along the entire inner wall length of the rotating tube at such angle to the inner wall that any galling should be obviated. The said angle can be duly ascertained during assembly of the apparatus. The scraper blade 16 can be continuous as shown or in the form of a strip brush, e.g. a plurality of depending fingers or wires which contact the internal surface of the tube 4.

The pressure at which the scraper blade 16 bears on the inner wall surface of tube 4 can be manually adjusted by setting the spring tension of springs 22. This is done by any suitable means such as by use of a tension rod 24 (FIGS. 5 and 6) connected to a spring 22 at one end and adjustably secured at the other end in opening 25 of a bracket 26 (FIGS. 2 and 5), which depends from support 17. The tension rods 24 are flattened on one side as shown in FIG. 6 and are provided with graduation marks 27, spaced, e.g. ¼ inch apart. The required tension can be set on springs 22 at each end of the scraper blade 16, or strip brush by noting the required setting on the graduated scale.

The scraper support 17 also carries a thermosensing element, pyrometer 28, which operates a temperature indicator controller 29 so as to maintain the desired constant operating temperature within the drier. It is understood that the pyrometer 28, temperature indicator control 29, power source (not shown) and heating elements 12 are electrically connected by means known in the art to provide automatic temperature control.

An air suction hood 30 equipped with a suction blower 31 draws drying air through the tube 4 at a suitable air velocity to ensure an adequate drying rate and prevent the build-up of moisture within the tube, which would otherwise result in caking of the product. The said drying air enters the drier at the lower end, and travels counter current to the direction of product flow within the tube. The suction hood 30 may, of course, be provided with depending walls (not shown) for more completely enclosing the upper end of tube 4.

In the process for puffing borax using the described apparatus, various hydrates of sodium tetraborate may be used as feedstock, but, the preferred material is the pentahydrate. This is obtainable commercially in granular form.

The preferred specification of the feedstock for production of expanded borax beads useful as detergent carriers is $Na_2B_4O_7 \cdot 5H_2O$ having a bulk density of about 990 grams/liter and a particle size distribution approximately as follows:

| | |
|---|---|
| 830 to 415μ | 25.8% |
| 415 to 250μ | 58.4% |
| 250 to 177μ | 13.0% |
| 177 to 149μ | 1.6% |
| below 149μ | 1.2% |

It will be understood, however, the the invention is not limited to the use of this particular feedstock.

Depending on the values of process parameters chosen, various degrees of expansion and residual water of crystallization can be obtained.

The operating temperature of the rotary drier may be varied from about 220° F to 450° F with residence times of about 45 to 90 seconds depending on the degree of dehydration desired. In no case should the temperature and residence time be such as to cause the production of anhydrous borax and the fusion thereof, which will lead to the formation of an insoluble product. The tubular drier may be rotated at speeds from 6 RPM to 30 RPM and the degree of inclination from the horizontal may be varied from about 10° to 30° to thereby control the residence time in the drier. In general, higher temperatures, greater rotational speed and greater degree of inclination of the tubular drier to the horizontal would be used to increase the production capacity of a given product.

The following table illustrates various products which may be obtained by choosing different operating parameters:

| BULK DENSITY | | | | |
|---|---|---|---|---|
| lbs/cubic feet | grams/ liter | Moles $H_2O$ | Moisture % | Borax % |
| Feedstock 62.0 | 990 | 5.0 | 31.0 | 69.0 |
| Product (1 28.0 | 449 | 3.9 | 26.0 | 74.0 |
| (2 20.0 | 321 | 3.55 | 24.0 | 76.0 |
| (3 12.0 | 193 | 3.0 | 22.0 | 78.0 |
| (4 6.0 | 96 | 1.9 | 15.0 | 85.0 |

Expanded borax beads having a bulk density in the range of about 12 to 20.0 lbs/cubic foot (about 190 to 320 grams/liter) and containing from about 3 to 3.6 moles of water of crystallization are particularly desirable for production of low phosphate detergent compositions as disclosed in my copending application Ser. No. 470,308, filed on May 15, 1974. These beads have adequate wall strength to withstand the attrition of detergent spray mix operations and can be used as detergent carriers in such operations without resulting in undesirable fines during production, transit and storage of the detergent product. They are also quite soluble in water. Such beads can be produced by operating the drier of the present invention at a temperature in the range of about 275°–350° F. The following example illustrates operation of the process for production of borax beads for this purpose.

EXAMPLE

Sodium pentaborate pentahydrate having a bulk density of about 990 grams/liter and a particle size distribution as set forth above was fed to a stainless steel tube of a drier as described herein having a diameter of 12 inches and a length of 10 feet. The tube was rotated at 20 RPM and was heated to a temperature of 300° F. It was inclined to 15° to the horizontal. The particle residence time in the drier was about 60 seconds. Under these conditions the drier delivered an output of 120 pounds per hour of a product of 190 grams/liter bulk density having a particle size distribution as follows:

| | |
|---|---|
| above 830μ | 5% |
| 830 – 415μ | 68% |
| 415 – 250μ | 23% |
| 250 – 177μ | 4% |

By variation of the rotating speed and slope of the tube between 10° to 30° to the horizontal and the temperature between 275° F to 350° F, various production rates for this product ranging from 50 pounds/hour to 200 pounds per hour are possible. The particle residence time can vary from 45 seconds to 90 seconds and the particle velocity from about 30 feet/minute to 90 feet/ minute.

It will be understood that the foregoing example is merely representative of the invention and that other dimensions and operating parameters may be used depending on the product desired.

The embodiments of the invention in which an exclusive property or privilege is claimed are defined as follows:

1. A borax puffing apparatus of the rotary drum type which comprises a rotary, inclined tube and a supporting frame; means for mounting said tube on said frame for rotary motion of the tube around its axis; drive means for rotating said tube around its axis; electrical heating means extending along the exterior of said tube for a major portion of its length for heating the tube to an interior temperature of from about 220° F to 450° F; a thermal insulating jacket fixed to said frame and surrounding said heating means and tube; said heating means being fixed to the interior of said jacket and being spaced from the exterior wall of said tube; an internal scraper having means bearing against an internal surface of said tube; air suction means positioned at the upper end of said tube to draw air through the tube counter current to the direction of feedstock material;

feed means at the upper end of the tube and discharge means at the lower end of the tube.

2. The apparatus of claim 1 wherein means are provided for adjusting the angle of inclination of said frame to the horizontal to thereby adjust the angle of inclination of said tube.

3. The apparatus of claim 2 wherein the thermal insulating jacket comprises a fixed externally insulated tube mounted within said frame and concentric with said rotary tube and wherein the electrical heating means comprises a plurality of tubular electrical heating elements secured to the inside wall of said fixed tube and closely spaced from the rotary tube with adequate clearance to allow the rotatable tube to freely rotate.

4. The apparatus of claim 1 wherein the internal scraper comprises: a support bar extending throughout the interior of said rotary tube and secured at its ends to said frame, an adjustable spring loaded scraper mounted on said support bar and having means bearing against the inner wall surface of the rotatable tube at an angle, and means for adjusting and setting the spring tension to thereby adjust the scraper pressure.

5. The apparatus of claim 4 wherein said support bar carries a thermosensing element connected to a temperature indicator controller so as to maintain a desired constant operating temperature within the rotary tube.

6. The apparatus of claim 4 wherein the scraper comprises a blade having an edge bearing against the inner wall surface of the drum.

7. The apparatus of claim 4 wherein the scraper comprises a strip brush having elements bearing against the inner wall surface of the drum.

8. The apparatus of claim 1 wherein the feed means comprises a vibratory table.

* * * * *

UNITED STATES PATENT OFFICE
CERTIFICATE OF CORRECTION

Patent No. 4,031,354  Dated  June 21, 1977

Inventor(s)  GODFREY B. D'SOUZA

It is certified that error appears in the above-identified patent and that said Letters Patent are hereby corrected as shown below:

Column 4, line 20, change "pentaborate" to --tetraborate--.

Signed and Sealed this

Twenty-fifth Day of October 1977

[SEAL]

Attest:

RUTH C. MASON  
Attesting Officer

LUTRELLE F. PARKER  
Acting Commissioner of Patents and Trademarks